US009356479B2

(12) United States Patent
Kono et al.

(10) Patent No.: US 9,356,479 B2
(45) Date of Patent: May 31, 2016

(54) HYBRID EXCITATION ROTATING ELECTRICAL MACHINE

(71) Applicants: Katsuichi Kono, Okazaki (JP); Junichi Yokota, Nagoya (JP); Ken Takeda, Anjo (JP)

(72) Inventors: Katsuichi Kono, Okazaki (JP); Junichi Yokota, Nagoya (JP); Ken Takeda, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 563 days.

(21) Appl. No.: 13/756,930

(22) Filed: Feb. 1, 2013

(65) Prior Publication Data
US 2013/0221771 A1 Aug. 29, 2013

(30) Foreign Application Priority Data

Feb. 29, 2012 (JP) ................................ 2012-044852

(51) Int. Cl.
| H02K 1/22 | (2006.01) |
| H02K 1/02 | (2006.01) |
| H02K 21/04 | (2006.01) |

(52) U.S. Cl.
CPC .............. *H02K 1/223* (2013.01); *H02K 21/046* (2013.01); *H02K 1/02* (2013.01)

(58) Field of Classification Search
CPC ........ H02K 1/223; H02K 1/02; H02K 21/046
USPC .............. 310/44, 112, 114, 181, 216, 156.36, 310/156.37, 180
See application file for complete search history.

(56) References Cited

U.S. PATENT DOCUMENTS

| 2,108,662 | A | * | 2/1938 | Fisher ........................... 310/168 |
| 3,743,873 | A | * | 7/1973 | de Jong ................ H02K 19/103 310/114 |
| 4,496,868 | A | * | 1/1985 | Advolotkin ............ H02K 19/10 310/112 |
| 5,672,926 | A | * | 9/1997 | Brandes ............... H02K 1/2746 174/DIG. 20 |
| 5,682,073 | A | | 10/1997 | Mizuno |
| 7,023,121 | B2 | | 4/2006 | Kusase et al. |

(Continued)

FOREIGN PATENT DOCUMENTS

| JP | A-03-169248 | 7/1991 |
| JP | A-6-351206 | 12/1994 |

(Continued)

OTHER PUBLICATIONS

May 7, 2013 International Search Report issued in International Patent Application No. PCT/JP2013/051224 (with translation).

*Primary Examiner* — John K Kim
*Assistant Examiner* — Noli Manaloto
(74) *Attorney, Agent, or Firm* — Oliff PLC

(57) ABSTRACT

A hybrid excitation machine comprising a rotor having first and second rotor cores with a gap between in an axial direction, wherein first magnetic poles excited by a permanent magnet and second magnetic poles not excited by the permanent magnet are alternately arranged in a circumferential direction in each rotor core. The first magnetic poles of the first and second rotor cores have different polarities, and the first magnetic poles of one rotor, core face the second magnetic poles of the other rotor core in the axial direction. A stator generating a magnetic field rotating the motor is placed radially outward of the rotor and an exciting coil exciting the second magnetic poles is placed in the gap, wherein the stator has, in the axial direction, first stator cores on both sides and a second stator core having lower magnetic resistance than the first stator core, in a center.

3 Claims, 6 Drawing Sheets

(56) References Cited

U.S. PATENT DOCUMENTS

| | | |
|---|---|---|
| 7,064,466 B2 | 6/2006 | Kusase |
| 7,078,840 B2 | 7/2006 | Kusase |
| 7,755,243 B2 | 7/2010 | Mizutani et al. |
| 7,969,056 B2 | 6/2011 | Mizutani et al. |
| 2003/0102758 A1 | 6/2003 | Kusase et al. |
| 2005/0236920 A1 | 10/2005 | Kusase et al. |
| 2006/0082238 A1 | 4/2006 | Kusase et al. |
| 2008/0136272 A1* | 6/2008 | Ishikawa ............... H02K 1/145 310/58 |
| 2010/0013340 A1* | 1/2010 | Brown ................ H02K 21/046 310/181 |

FOREIGN PATENT DOCUMENTS

| | | |
|---|---|---|
| JP | A-8-251891 | 9/1996 |
| JP | A-2003-164127 | 6/2002 |
| JP | A-2006-333642 | 12/2006 |
| JP | B2-4623471 | 2/2011 |
| JP | B2-4623472 | 2/2011 |

* cited by examiner

HYBRID EXCITATION ROTATING ELECTRICAL MACHINE

INCORPORATION BY REFERENCE

The disclosure of Japanese Patent Application No. 2012-044852 filed on Feb. 29, 2012 including the specification, drawings and abstract is incorporated herein by reference in its entirety.

BACKGROUND OF THE INVENTION

The present invention relates to hybrid excitation rotating electrical machines, and more particularly to hybrid excitation rotating electrical machines using both a permanent magnet and an electromagnet as an exciting circuit.

DESCRIPTION OF THE RELATED ART

Conventionally, hybrid excitation rotating electrical machines including a permanent magnet and an electromagnet are known in the art (see, e.g., Japanese Patent Application Publication No. H06-351206 (JP H06-351206 A)). Such a rotating electrical machine includes a rotor and a stator placed radially outward of the rotor to generate a rotating magnetic field rotating the rotor. The stator has a stator core and a stator coil. The rotor has a shaft extending in the axial direction, and first and second cores separated in the axial direction. Each of the first and second cores includes permanent magnet excitation magnetic poles that are excited by a permanent magnet, and non-excited permanent magnet non-excitation magnetic poles that are not excited by the permanent magnet, and the permanent magnet excitation magnetic poles and the permanent magnet non-excitation magnetic poles are alternately arranged in the circumferential direction in the radial end of each of the first and second cores. The permanent magnet excitation magnetic poles in the first core and the permanent magnet excitation magnetic poles in the second core have polarities that are inverted with respect to each other. The permanent magnet excitation magnetic poles in the first core are placed so as to face the permanent magnet non-excitation magnetic poles in the second core in the axial direction, and the permanent magnet non-excitation magnetic poles in the first core are placed so as to face the permanent magnet excitation magnetic poles in the second core in the axial direction.

The amount of magnetic flux of the permanent magnet is substantially constant. The rotating electrical machine further includes an exciting coil that excites the permanent magnet non-excitation magnetic poles. When current is applied from the outside to the exciting coil, the exciting coil excites the permanent magnet non-excitation magnetic poles to generate magnetic flux that weakens or strengthens the magnetic flux generated by the permanent magnet. Thus, according to the above rotating electrical machine, the rotor can be appropriately rotated by combined magnetic flux of the magnetic flux of the permanent magnet and the magnetic flux of the electromagnet.

SUMMARY OF THE INVENTION

In the rotating electrical machine of JP H06-351206 A, however, the exciting coil is placed between two stator cores that are separated in the axial direction with a gap therebetween. The exciting coil is placed near a yoke that covers the outer periphery of the stator core. The stator core is formed by a plurality of stacked steel plates that are stacked in the axial direction. Thus, in the structure of such a rotating electrical machine, a magnetic path radially outward of the exciting coil is narrow on the side of the stator, and the magnetic resistance thereof is relatively high. Accordingly, when current is applied to the exciting coil, magnetic saturation occurs radially outward of the exciting coil due to concentration of the magnetic flux, thereby causing reduction in rotation torque. The magnetic saturation can be reduced by increasing the radial thickness of the stator core radially outward of the exciting coil. In such a structure, however, the overall radial thickness of the stator core is increased, whereby the size of the rotating electrical machine itself is increased.

The present invention was developed to solve the above problems, and it is an object of the present invention to provide a hybrid excitation rotating electrical machine capable of reducing magnetic saturation during application of current to an exciting coil without increasing the size.

The above object is achieved by a hybrid excitation rotating electrical machine including: a rotor having first and second rotor cores that are separated in an axial direction with a gap between the rotor cores, wherein first magnetic poles that are excited by a permanent magnet and second magnetic poles that are not excited by the permanent magnet are alternately arranged in a circumferential direction in each of the first and second rotor cores, the first magnetic poles of the first rotor core have a different polarity from that of the first magnetic poles of the second rotor core, and the first magnetic poles of one of the first and second rotor cores are placed so as to face the second magnetic poles of the other of the first and second rotor cores in the axial direction with the gap between the rotor cores, the hybrid excitation rotating electrical machine further including: a stator that is placed radially outward of the rotor, and that generates a rotating magnetic field rotating the rotor; and an exciting coil that is placed in the gap, and that excites the second magnetic poles, wherein the stator has first stator cores provided on both sides in the axial direction, and a second stator core provided in a center in the axial direction and having lower magnetic resistance in the axial direction than the first stator core.

According to the present invention, magnetic saturation during application of current to an exciting coil can be reduced without increasing the size.

DETAILED DESCRIPTION OF THE EMBODIMENTS

A specific embodiment of a hybrid excitation rotating electrical machine according to the present invention will be described below with reference to the accompanying drawings.

Figure 1:
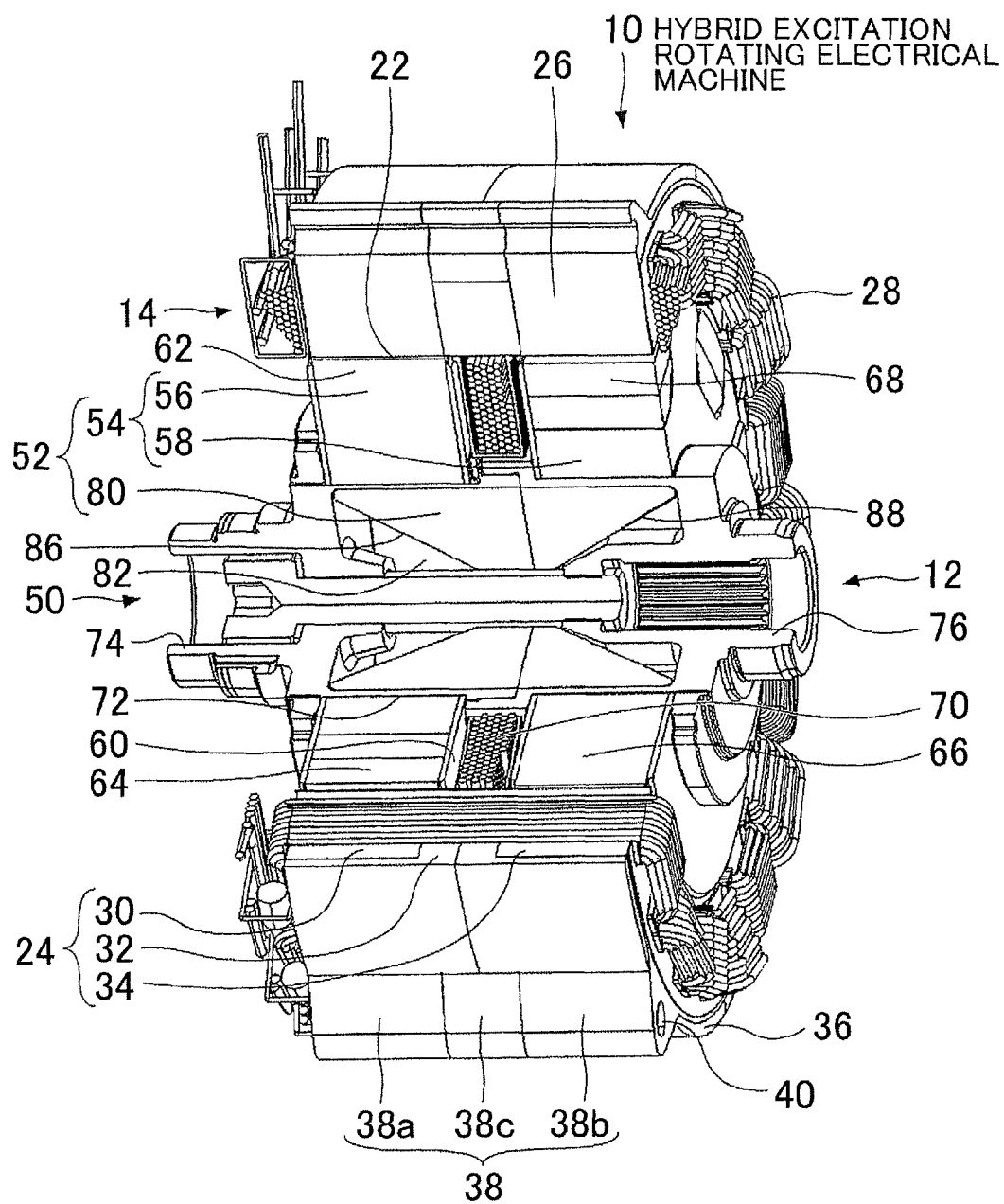
FIG. 1 is a perspective view showing the structure of a hybrid excitation rotating electrical machine according to an embodiment of the present invention.
Figure 2:
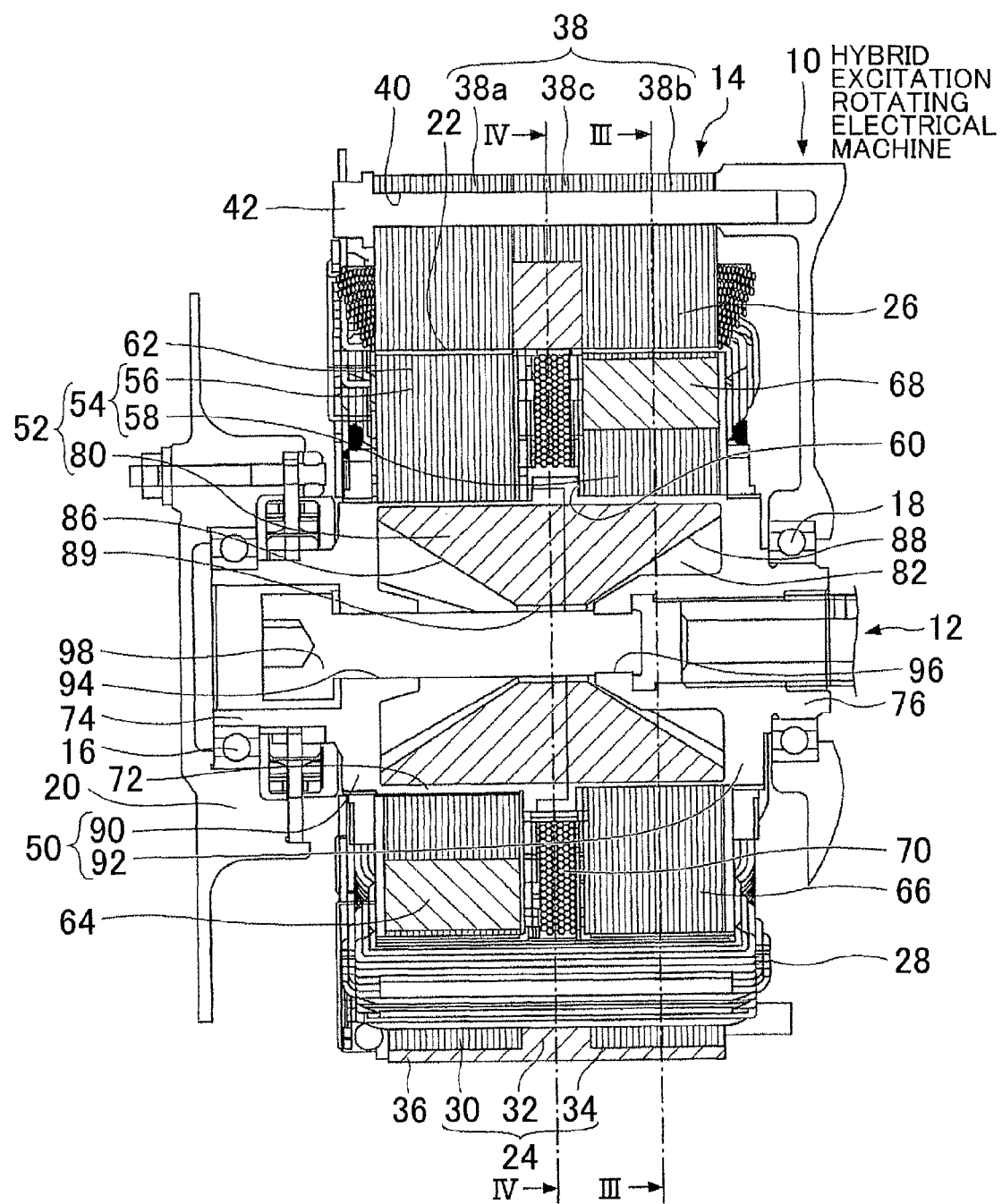
FIG. 2 is a sectional view of the hybrid excitation rotating electrical machine according to the embodiment of the present invention taken along a plane including an axis line.
Figure 3:
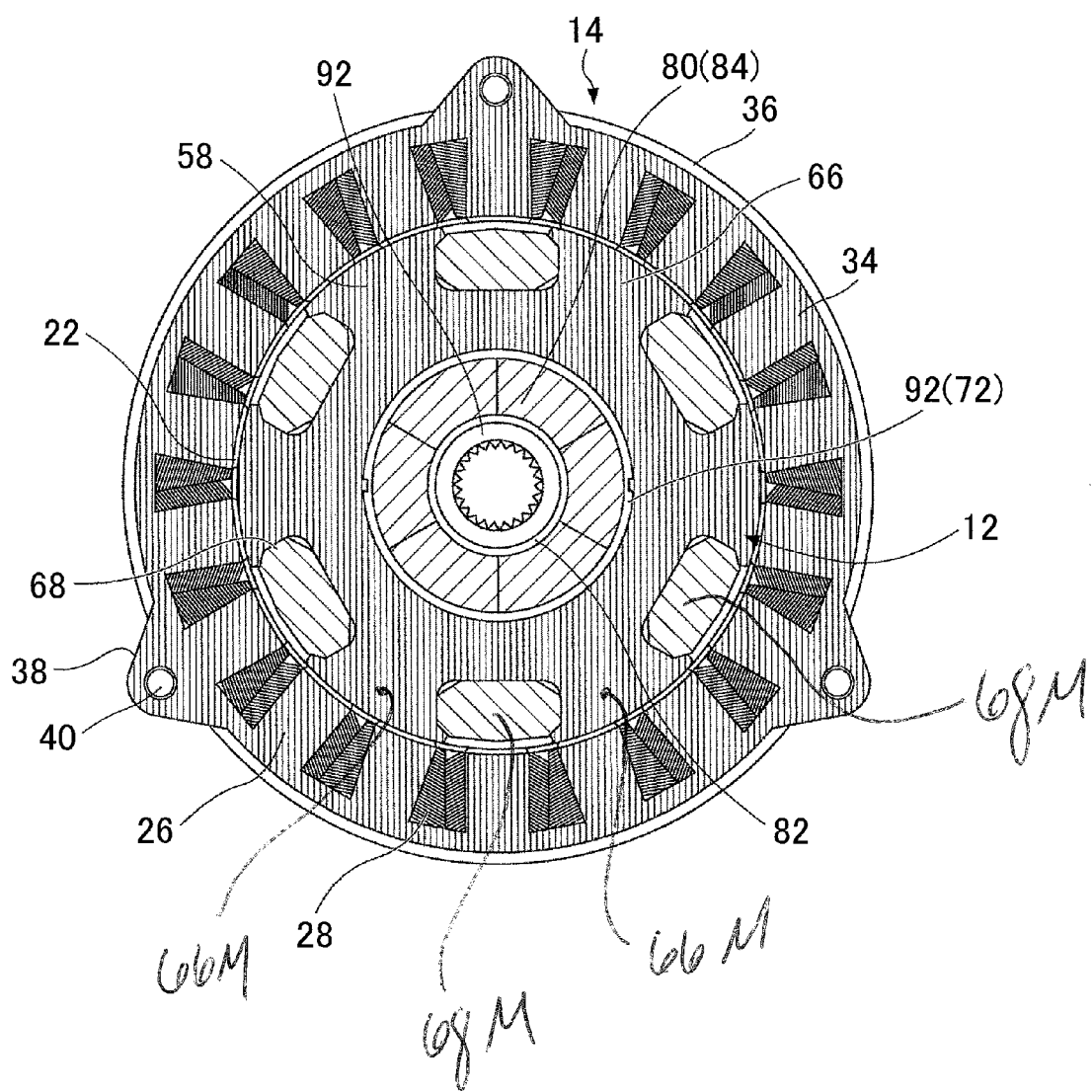
FIG. 3 is a sectional view of the hybrid excitation rotating electrical machine according to the embodiment of the present invention taken along line in FIG. 2.
Figure 4:
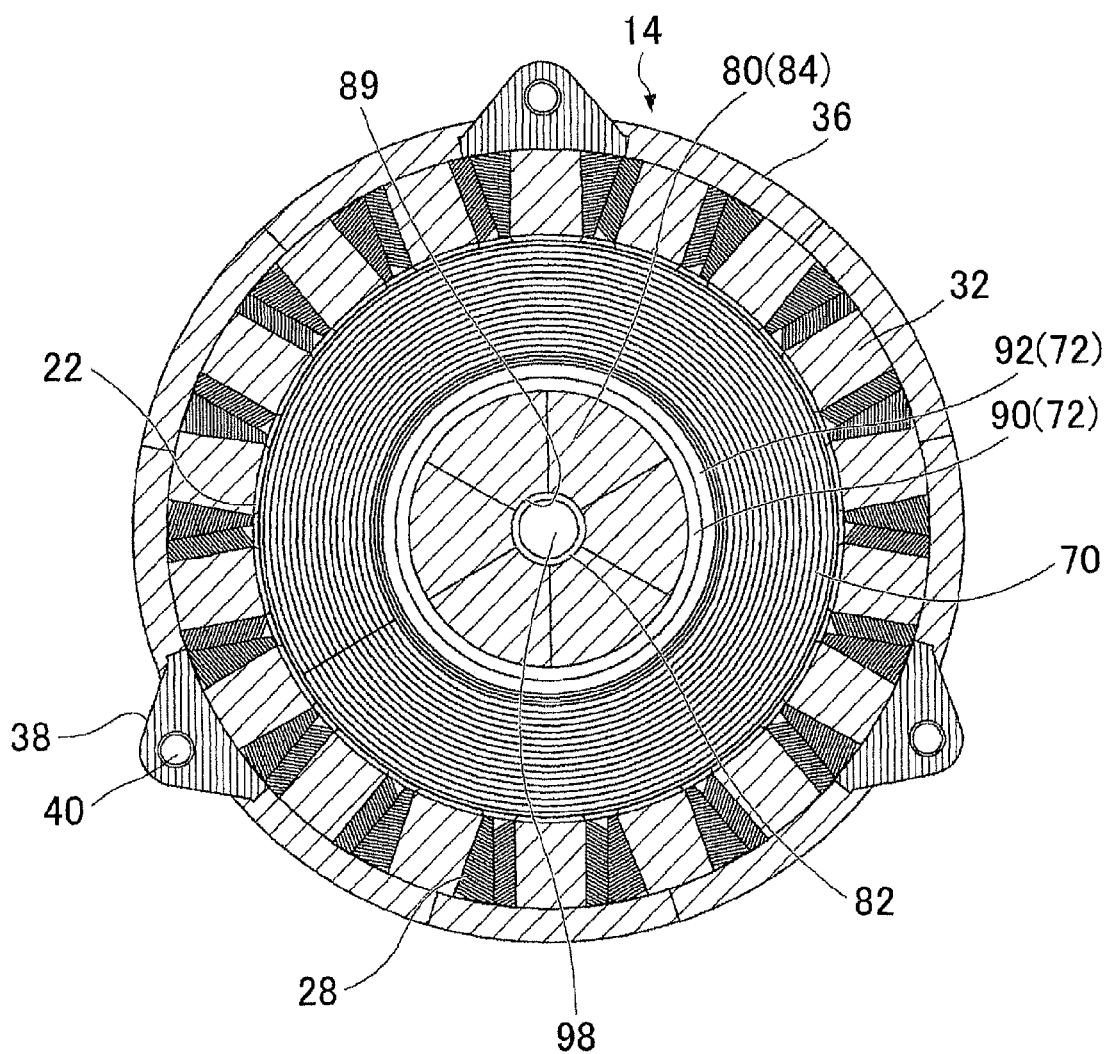
FIG. 4 is a sectional view of the hybrid excitation rotating electrical machine according to the embodiment of the present invention taken along line IV-IV in FIG. 2.
Figure 5:
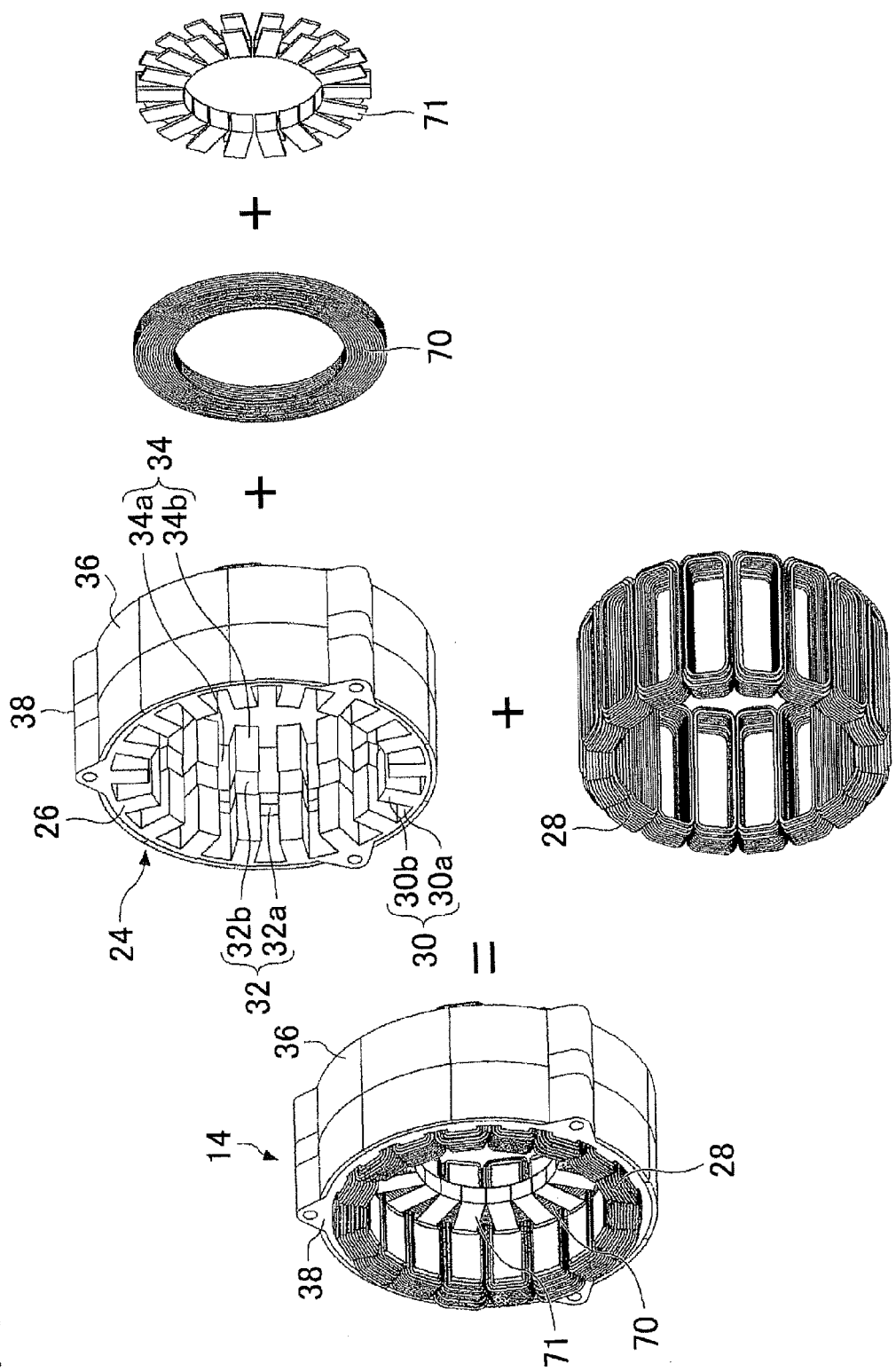
FIG. 5 shows an overall perspective view and an exploded perspective view of a stator of the hybrid excitation rotating electrical machine according to the embodiment of the present invention.

FIG. 1 is a perspective view showing the structure of a hybrid excitation rotating electrical machine 10 according to an embodiment of the present invention. The hybrid excitation rotating electrical machine 10 is shown partially cutaway in FIG. 1. FIG. 2 is a sectional view of the hybrid excitation rotating electrical machine 10 of the present embodiment taken along a plane including, an axis line. FIG. 3 is a sectional view of the hybrid excitation rotating electrical machine 10 of the present embodiment taken along line III-III in FIG. 2. FIG. 4 is a sectional view of the hybrid excitation rotating electrical machine 10 of the present embodiment taken along line IV-IV in FIG. 2. FIG. 5 shows an overall perspective view and an exploded perspective view of the hybrid excitation rotating electrical machine 10 according to the present embodiment.

In the present embodiment, the hybrid excitation rotating electrical machine 10 includes a rotor 12 that is rotatable about an axis, and a stator 14 that generates a rotating magnetic field rotating the rotor 12. The rotor 12 is rotatably supported by a case 20 via bearings 16, 18 at both axial ends. The stator 14 is placed radially outward of the rotor 12, and is fixed to the case 20. The rotor 12 and the stator 14 face each other in the radial direction with an air gap 22 of a predetermined length therebetween.

The stator 14 has a stator core 24 and a stator coil 28. The stator core 24 is formed in a hollow cylindrical shape. A stator tooth 26 is formed on the inner peripheral surface of the stator core 24. The stator tooth 26 protrudes inward in the radial direction of the stator core 24, namely toward the axis, and extends between the axial ends of the stator core 24. A plurality (e.g., 12 or 18) of the stator teeth 26 are provided in the circumferential direction in the inner peripheral surface of the stator core 24, and are arranged at regular intervals along the circumferential direction.

The stator coil 28 is wound around each stator tooth 26. A plurality (e.g., 12 or 18) of the stator coils 28 are provided in the circumferential direction in the inner peripheral surface of the stator core 24, and are arranged at regular intervals along the circumferential direction. In the case where the hybrid excitation rotating electrical machine 10 is applied to, e.g., a three-phase alternating current (AC) motor, each stator coil 28 forms one of a U-phase coil, a V-phase coil, and a W-phase coil.

The stator core 24 is divided in the axial direction, and has a first stator core 30, a second stator core 32, and a third stator core 34. The first to third stator cores 30 to 34 are arranged in the axial direction. The first and third stator cores 30, 34 are placed at both axial ends. The second stator core 32 is placed in the center in the axial direction, and is interposed between the first stator core 30 and the third stator core 34 in the axial direction. The stator core 24 is thus divided in the axial direction into the second stator core 32 located in the center in the axial direction and the first and third stator cores 30, 34 located on both sides of the second stator core 32 in the axial direction.

The first to third stator cores 30 to 34 are formed in a hollow cylindrical shape, and have substantially the same inner diameter and substantially the same outer diameter. Each of the first to third stator cores 30 to 34 is formed by a back yoke portion 30a, 32a, 34a formed in an annular shape, and a stator teeth portion 30b, 32b, 34b protruding from the inner peripheral surface of the back yoke portion 30a, 32a, 34a toward the axis. In each of the first to third stator cores 30 to 34, the back yoke portion 30a, 32a, 34a is formed integrally with the stator teeth portion 30b, 32b, 34b. In each of the first to third stator cores 30 to 34, the back yoke portion 30a, 32a, 34a and the stator teeth portion 30b, 32b, 34b may be provided as separate members.

The stator teeth 26 are provided in each of the first to third stator cores 30 to 34, and correspond to the stator teeth portions 30b, 32b, 34b. The stator teeth portions 30b, 32b, 34b of the first to third stator cores 30 to 34 are provided so as to be arranged next to each other in the axial direction. Each stator coil 28 is formed so as to extend through the first to third stator cores 30 to 34 in the axial direction in a slot between the stator teeth 26 located next to each other in the circumferential direction.

Each of the first and third stator cores 30, 34 is an electromagnetic steel plate core formed by stacking a plurality of insulation coated electromagnetic steel plates in the axial direction. The second stator core 32 is a dust core made of a soft magnetic material such as iron, specifically a material produced by compression molding insulation coated soft magnetic material powder. The magnetic resistance in the axial direction of the second stator core 32 is lower than that in the axial direction of the first and third stator cores 30, 34.

A thin cylindrical yoke 36 is provided radially outward of the stator core 24. The yoke 36 is formed so as to cover the entire outer peripheries of the first to third stator cores 30 to 34, and supports the first to third stator cores 30 to 34. Like the second stator core 32, the yoke 36 is a dust core made of a material produced by compression molding insulation coated soft magnetic material powder. The magnetic resistance in the axial direction of the yoke 36 is lower than that in the axial direction of the first and third stator cores 30, 34. The yoke 36 may be formed integrally with the second stator core 32. The yoke 36 is bonded and fixed to the radially outer surfaces of the first stator core 30 and the third stator core 34. The first stator core 30 and the third stator core 34 are magnetically coupled together via the yoke 36 and the second stator core 32.

The stator core 24 has an attachment portion 38 that protrudes to the radially outer side and that attaches and fixes the stator 14 to the case 20. The attachment portion 38 is formed by a plurality of electromagnetic steel plates that are stacked in the axial direction. The attachment portion 38 has an attachment portion 38a formed integrally with the first stator core 30, an attachment portion 38b formed integrally with the third stator core 34, and an attachment portion 38c interposed between the attachment portions 38a, 38b. The attachment portion 38c is placed radially outward of the second stator core 32. The attachment portion 38c may be formed integrally with the second stator core 32 instead of being formed by the plurality of electromagnetic steel plates that are stacked in the axial direction. A plurality of (e.g., 3) the attachment portions 38 are provided in the circumferential direction. A through hole 40 is provided in each attachment portion 38 so as to extend therethrough in the axial direction. The stator 14 is fixed to the case 20 by tightening into the case 20 bolts 42 extending through the through holes 40 of the attachment portions 38.

The rotor 12 is placed radially inward of the stator 14. The rotor 12 has a shaft 50 and a rotor core 52. The shaft 50 extends in the axial direction, and extends beyond the axial ends of the stator 14 at its both axial ends. The shaft 50 need only extend beyond the axial end of the stator 14 on at least one side in the axial direction. The shaft 50 is made of a material having predetermined iron loss, specifically carbon steel such as S45C. The rotor core 52 has a radially outer rotor core 54 that is placed radially outward of the shaft 50 so as to be supported by the shaft 50. The radially outer rotor core 54 is formed in a hollow cylindrical shape, and is fixed to the radially outer surface of the shaft 50.

The radially outer rotor core 54 is divided in the axial direction, and has a first radially outer rotor core 56 and a second radially outer rotor core 58. The first and second radially outer rotor cores 56, 58 are formed in a hollow cylindrical shape, and are placed radially outward of the shaft 50 so as to be supported by the shaft 50. Each of the first and second radially outer rotor cores 56, 58 is formed by a plurality of electromagnetic steel plates that are stacked in the axial direction. The first radially outer rotor core 56 and the second radially outer rotor core 58 are separated from each other in the axial direction with an annular gap 60 therebetween.

The radially outer surface of the first radially outer rotor core 56 faces the radially inner surface of the first stator core 30 in the radial direction. That is, the radially outer surface of the first radially outer rotor core 56 and the radially inner surface of the first stator core 30 face each other in the radial direction. The radially outer surface of the second radially outer rotor core 58 faces the radially inner surface of the third stator core 34 in the radial direction. That is, the radially outer surface of the second radially outer rotor core 58 and the radially inner surface of the third stator core 34 face each other in the radial direction. The gap 60 faces the radially inner surface of the second stator core 32, and is provided radially inward of the second stator core 32.

A rotor tooth 62 is formed in the outer periphery of the first radially outer rotor core 56. The rotor tooth 62 protrudes outward in the radial direction of the first radially outer rotor core 56. A plurality (e.g., 6) of the rotor teeth 62 are provided in the circumferential direction on the outer peripheral surface of the first radially outer rotor core 56, and are arranged at regular intervals along the circumferential direction.

A permanent magnet 64 is attached between the rotor teeth 62 adjoining each other in the circumferential direction, so as to adjoin the rotor teeth 62. The permanent magnet 64 is placed radially outward of the first radially outer rotor core 56. The permanent magnet 64 is, e.g., a ferrite magnet. A plurality (e.g., 6) of the permanent magnets 64 are provided in the circumferential direction, and are provided at regular intervals along the circumferential direction. Each permanent magnet 64 has a predetermined width (angle) in the circumferential direction, and has a predetermined radial thickness. Each permanent magnet 64 is magnetized with a predetermined polarity (e.g., the radially outer side is N pole and the radially inner side is S pole).

The radially outer end face of the permanent magnet 64 and the radially outer end face of the rotor tooth 62 are formed at substantially the same distance from the axis. The first radially outer rotor core 56 has permanent magnet excitation magnetic poles that are excited by the permanent magnets 64, and non-excited permanent magnet non-excitation magnetic poles that are not excited by the permanent magnets 64. The permanent magnet non-excitation magnetic poles are formed in the rotor teeth 62. The permanent magnet excitation magnetic poles and the permanent magnet non-excitation magnetic poles are alternately arranged in the circumferential direction. The first radially outer rotor core 56 has a magnetic pole of a different polarity at every predetermined angle, and has a predetermined number (e.g., 12) of magnetic poles in the circumferential direction by the permanent magnet excitation magnetic poles and the permanent magnet non-excitation magnetic poles.

A rotor tooth 66 is formed in the outer periphery of the second radially outer rotor core 58. The rotor tooth 66 protrudes outward in the radial direction of the second radially outer rotor core 58. A plurality (e.g., 6) of the rotor teeth 66 are provided in the circumferential direction on the outer peripheral surface of the second radially outer rotor core 58, and are arranged at regular intervals along the circumferential direction.

A permanent magnet 68 is attached between the rotor teeth 66 adjoining each other in the circumferential direction, so as to adjoin the rotor teeth 66. The permanent magnet 68 is placed radially outward of the second radially outer rotor core 58. The permanent magnet 68 is, e.g., a ferrite magnet. A plurality (e.g., 6) of the permanent magnets 68 are provided in the circumferential direction, and are provided at regular intervals along the circumferential direction. Each permanent magnet 68 has a predetermined width (angle) in the circumferential direction, and has a predetermined radial thickness. Each permanent magnet 68 is magnetized with a predetermined polarity different from that of the permanent magnet 64 (e.g., the radially outer side is S pole and the radially inner side is N pole). That is, the permanent magnet 68 and the permanent magnet 64 have polarities that are inverted with respect to each other.

The radially outer end face of the permanent magnet 68 and the radially outer end face of the rotor tooth 66 are formed at substantially the same distance from the axis. The second radially outer rotor core 58 has permanent magnet excitation magnetic poles 68M that are excited by the permanent magnets 68, and non-excited permanent magnet non-excitation magnetic poles 66M that are not excited by the permanent magnets 68. The permanent magnet non-excitation magnetic poles 66M are formed in the rotor teeth 66. The permanent magnet excitation magnetic poles and the permanent magnet non-excitation magnetic poles are alternately arranged in the circumferential direction. The second radially outer rotor core 58 has a magnetic pole of a different polarity at every predetermined angle, and has the same predetermined number (e.g., 12) of magnetic poles as the first radially outer rotor core 56 in the circumferential direction by the permanent magnet excitation magnetic poles and the permanent magnet non-excitation magnetic poles.

The permanent magnet excitation magnetic poles of the first radially outer rotor core 56 are arranged so as to face the permanent magnet non-excitation magnetic poles of the second radially outer rotor core 58 in the axial direction with the gap 60 therebetween. That is, the permanent magnets 64 of the first radially outer rotor core 56 are arranged so as to face the rotor teeth 66 of the second radially outer rotor core 58 in the axial direction with the gap 60 therebetween. The permanent magnet non-excitation magnetic poles of the first radially outer rotor core 56 are arranged so as to face the permanent magnet excitation magnetic poles of the second radially outer rotor core 58 in the axial direction with the gap 60 therebetween. That is, the rotor teeth 62 of the first radially outer rotor core 56 are arranged so as to face the permanent magnets 68 of the second radially outer rotor core 58 in the axial direction with the gap 60 therebetween.

An exciting coil 70 that excites the permanent magnet non-excitation magnetic poles of the rotor teeth 62, 66 is placed in the gap 60, namely between the first radially outer rotor core 56 and the second radially outer rotor core 58 in the axial direction. The exciting coil 70 fills almost the entire region of the gap 60. The exciting coil 70 is formed in an annular shape around the shaft 50, and is wound in a toroidal form. The exciting coil 70 is placed radially outward of the shaft 50, is placed radially inward of the second stator core 32, and faces the second stator core 32 in the radial direction. The exciting coil 70 is attached and fixed to the stator 14 or the stator core 24. A direct current is supplied to the exciting coil 70. When the direct current is supplied to the exciting coil 70, magnetic flux is generated which extends on the radially inner side (the axis side) of the exciting coil 70 in the axial direction. The magnetic flux is generated in an amount corresponding to the direct current that is supplied to the exciting coil 70.

Fixing of the exciting coil 70 to the stator 14 may be implemented by direct bonding of the exciting coil 70 and the stator 14. A plurality of U-shaped holding members (clips) 71 that hold the annular exciting coil 70 from the radially inner side are provided in the circumferential direction, and a plurality of holes 73 are formed in the circumferential direction in the opposing axial end faces of the first and third stator cores 30, 34 of the stator core 24 or in the radially inner surface of the second stator core 32. Fixing of the exciting coil 70 to the stator 14 may be implemented by hanging pawl portions on both sides of each holding member 71 through the holes 73. FIG. 5 shows the state where the exciting coil 70 is fixed to the stator 14 by the plurality of holding members 71 provided in the circumferential direction.

The shaft 50 is formed in a hollow shape. The shaft 50 has a large diameter cylindrical portion 72 having a relatively large diameter, and small diameter cylindrical portions 74, 76 having a relatively small diameter. The small diameter cylindrical portions 74, 76 are provided at both axial ends. The small diameter cylindrical portions 74, 76 of the shaft 50 are supported by the case 20 via the bearings 16, 18. The large diameter cylindrical portion 72 is provided in the center in the axial direction, and is interposed between the small diameter cylindrical portions 74, 76 at both axial ends. The first and second radially outer rotor cores 56, 58 are placed radially outward of the large diameter cylindrical portion 72 so as to be supported by the large diameter cylindrical portion 72, and are fixed to the radially outer surface of the large diameter cylindrical portion 72.

The rotor core 52 has a radially inner rotor core 80 that is placed radially inward of the shaft 50 so as to be supported by the shaft 50. The radially inner rotor core 80 is placed radially inward of the first radially outer rotor core 56 and the second radially outer rotor core 58 of the rotor core 52 and the exciting coil 70. A hollow space 82 is formed in the large diameter cylindrical portion 72 of the shaft 50. The radially inner rotor core 80 is accommodated in the hollow space 82 of the large diameter cylindrical portion 72, and is bonded and fixed to the radially inner surface of the large diameter cylindrical portion 72. The radially inner rotor core 80 is made of a soft magnetic material, specifically a material produced by compression molding insulation coated soft magnetic material powder. The radially inner rotor core 80 is made of a material having smaller iron loss than the shaft 50.

The radially inner rotor core 80 is divided in the circumferential direction, and is formed by a plurality (e.g., 6) of rotor core pieces 84 each formed in a sector shape as viewed in the axial direction. The division of the radially inner rotor core 80 in the circumferential direction is performed at regular intervals (equal angles) in the circumferential direction, and the rotor core pieces 84 have the same shape. The number of pieces into which the radially inner rotor core 80 is divided in the circumferential direction, namely the number of rotor core pieces 84, is the number of poles of the first and second radially outer rotor cores 56, 58 in the radially outer rotor core 54, or a divisor of the number of poles. For example, in the case where the number of poles is "12," the radially inner rotor core 80 is divided into "2," "3," "4," "6," or "12" pieces (in FIGS. 3 and 4, the radially inner rotor core 80 is divided into "6" pieces).

The division of the radially inner rotor core 80 in the circumferential direction is performed along the lines extending through the axis of the rotor 12 and the shaft 50 and the circumferential centers of at least two of the permanent magnets 64, 68 and the rotor teeth 62, 66 (that is, the permanent magnet excitation magnetic poles and the permanent magnet non-magnetization magnetic poles) which are alternately arranged in the circumferential direction in the first and second radially outer rotor cores 56, 58 of the rotor 12. That is, each plane including the plane that divides the radially inner rotor core 80 in the circumferential direction extends through the axis of the rotor 12 and the shaft 50 and through the circumferential center of any of the permanent magnets 64, 68 and the rotor teeth 62, 66 (that is, the permanent magnet excitation magnetic poles and the permanent magnet non-magnetization magnetic poles).

The radially inner rotor core 80 has notch holes 86, 88 extending in the axial direction in its axial ends. The notch holes 86, 88 are provided at both axial ends. Each of the notch holes 86, 88 is formed in a tapered or stair-like shape so that its diameter decreases from the axial end face toward the axial center. The diameter at the axial end (the shallowest portion) of the cutout hole 86, 88 substantially matches the inner diameter of the large diameter cylindrical portion 72 of the shaft 50, and the diameter in the axial central portion (the deepest portion) of the cutout hole 86, 88 is a predetermined diameter. The radially inner rotor core 80 has a predetermined radial thickness in the axial central portion, and has a smaller radial thickness at both axial ends than in the axial central portion. The radial thickness of the large diameter cylindrical portion 72 of the shaft 50 is set so as to maintain the strength required to transfer motor torque, and the radial thickness of the axial central portion of the radially inner rotor core 80 is set to the predetermined thickness with which the magnetic flux generated by the exciting coil 70 is not saturated. Thus, the radial thickness of the axial central portion of the radially inner rotor core 80 is larger than that of the large diameter cylindrical portion 72 of the shaft 50.

The notch hole 86 and the notch hole 88 communicate with each other in the center in the axial direction, and are connected together at their deepest portions through a through hole 89 extending through the rotor core 80 in the axial direction. That is, the radially inner rotor core 80 is formed in a hollow shape so as to have the through hole 89. All of the notch holes 86, 88 and the through hole 89 of the radially inner rotor core 80 are provided on the axis line of the shaft 50. The through hole 89 of the radially inner rotor core 80 has substantially the same diameter as the deepest portions of the notch holes 86, 88.

The rotor 12 is divided into two portions in the axial direction. The shaft 50 is divided into two portions in the axial direction, and is formed by two cup-shaped members 90, 92 that are fitted together. The shaft 50 is divided in the axial direction substantially along the center in the axial direction. The cup-shaped member 90 has the small diameter cylindrical portion 74 and a part of the large diameter cylindrical portion 72 (specifically, a half connected to the small diameter cylindrical portion 74). The cup-shaped member 92 has the small diameter cylindrical portion 76 and a part of the large diameter cylindrical portion 72 (specifically, a half connected to the small diameter cylindrical portion 76). The shaft 50 is formed by fitting the cup-shaped member 90 and the cup-shaped member 92 together. The first radially outer rotor core 56 is supported by the cup-shaped member 90, and the second radially outer rotor core 58 is supported by the cup-shaped member 92. The first radially outer rotor core 56 is fixed to the radially outer surface of the cup-shaped member 90, and the second radially outer rotor core 58 is fixed to the radially outer surface of the cup-shaped member 92.

Bolt holes 94, 96 extending in the axial direction on the axis are formed in the cup-shaped members 90, 92, respectively. The bolt holes 94, 96 have substantially the same diameter as the through hole 89 of the radially inner rotor core 80. A bolt 98 is inserted in the bolt holes 94, 96 of the cup-shaped members 90, 92 and the through hole 89 of the radially inner rotor core 80. The cup-shaped member 90 and the cup-shaped member 92 are fitted together, and are fastened together by the bolt 98.

The radially inner rotor core 80 may be divided into two portions in the axial direction. In this case, the radially inner rotor core 80 may be divided in the axial direction at a position corresponding to the position where the shaft 50 is divided in the axial direction, or substantially along the center in the axial direction. One of the divided two portions of the radially inner rotor core 80 is bonded and fixed to the radially inner surface of the cup-shaped member 90 of the shaft 50, and the other divided portion of the radially inner rotor core 80 is bonded and fixed to the radially inner surface of the cup-shaped member 92.

If a direct current is supplied to the annular exciting coil 70 in the above structure of the hybrid excitation rotating electrical machine 10, magnetic flux is generated which extends on the radially inner side (the axis side) of the exciting coil 70 in the axial direction. The magnetic flux generated by the electromagnet using the exciting coil 70 flows through the permanent magnet non-excitation magnetic poles of the first or second radially outer rotor core 56, 58, the radially inner rotor core 80, the permanent magnet non-excitation magnetic poles of the second or first radially outer rotor core 58, 56, the air gap 22, the stator core 24, the air gap 22, and the permanent magnet non-excitation magnetic poles of the first or second radially outer rotor core 56, 58 in this order. If such magnetic flux is generated, the permanent magnet non-excitation magnetic poles of the first and second radially outer rotor cores 56, 58 are excited. The magnetic flux thus generated by the electromagnet weakens or strengthens the magnetic flux generated by the permanent magnets 46, 68. The amount of magnetic flux generated by the electromagnet is adjusted according to the magnitude of the direct current that is applied to the exciting coil 70.

Thus, according to the present embodiment, torque that rotates the rotor 12 about the stator 14 can be adjusted by the combined magnetic flux of the magnetic flux generated by the permanent magnets 64, 68 and the magnetic flux generated by the electromagnet using the exciting coil 70, whereby the rotor 12 can be appropriately rotated.

Figure 6A:
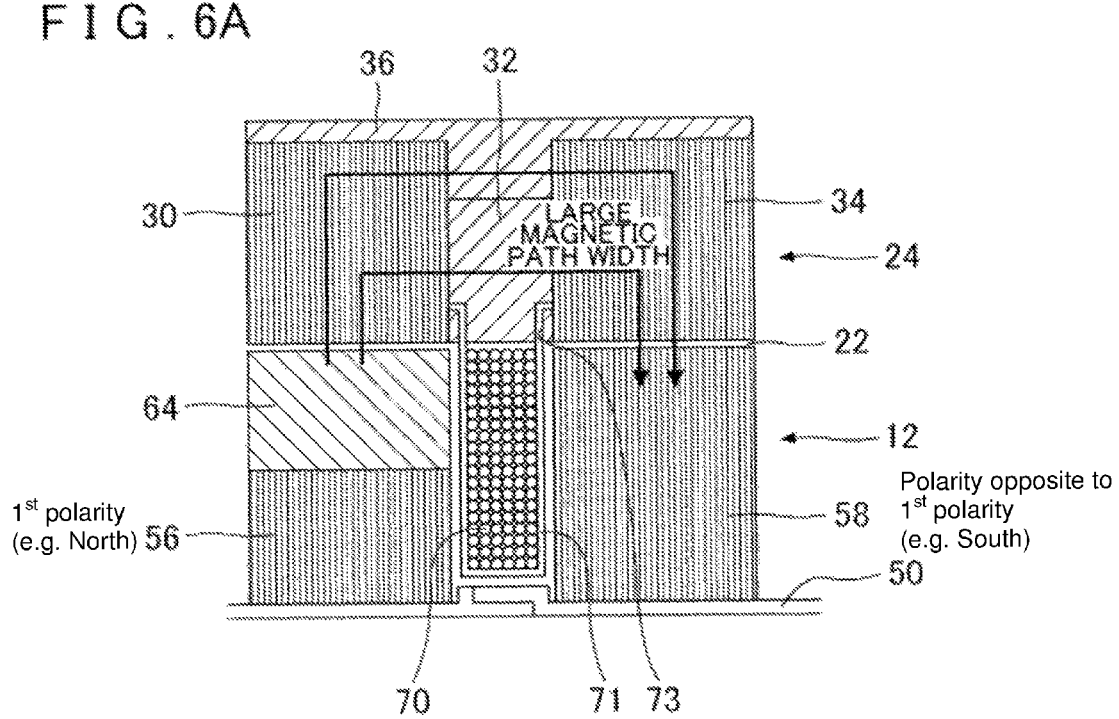
FIG. 6A and FIG. 6B show diagrams illustrating effects of the hybrid excitation rotating electrical machine according to the embodiment of the present invention.
Figure 6B:
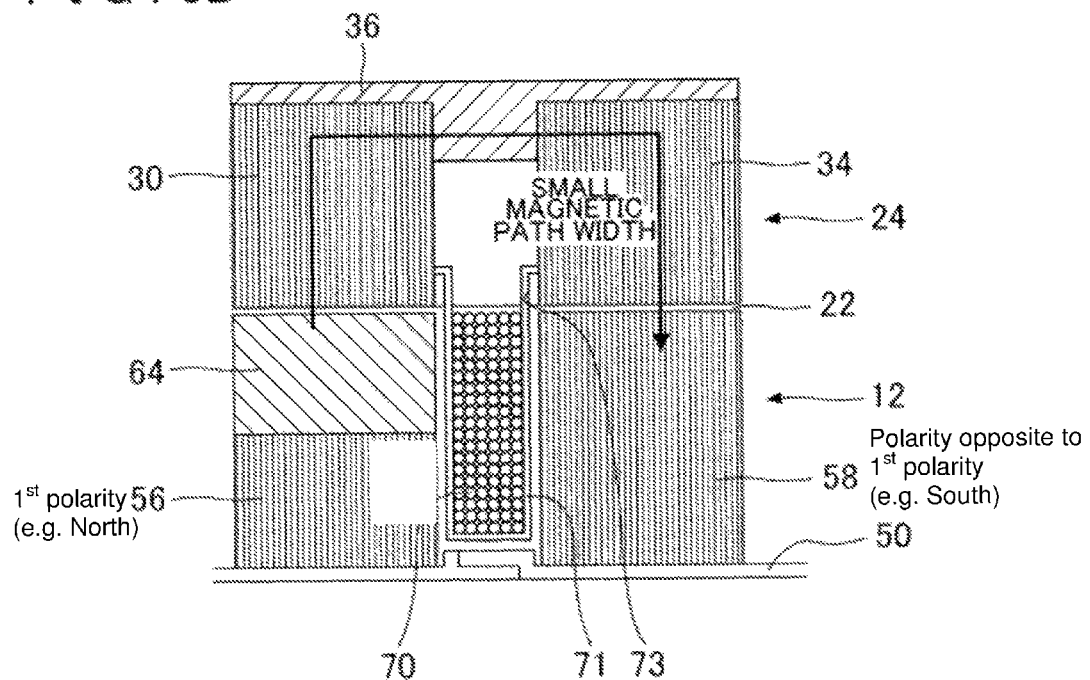

FIG. 6A and FIG. 6B shows diagrams illustrating effects of the hybrid excitation rotating electrical machine 10 of the present embodiment. FIG. 6A is a diagram showing a magnetic path in the present embodiment, and FIG. 6B is a diagram showing a magnetic path in a comparative example that is compared with the present embodiment.

In the hybrid excitation rotating electrical machine 10 of the present embodiment, the exciting coil 70 is placed in the gap 60 extending in the axial direction between the first radially outer rotor core 56 and the second radially outer rotor core 58 of the rotor 12. Specifically, the exciting coil 70 is positioned so as to overlap the first radially outer rotor core 56 and the second radially outer rotor core 58 in the radial direction, and so as not to overlap the first radially outer rotor core 56 and the second radially outer rotor core 58 in the axial direction. That is, the exciting coil 70 is positioned so that both axial ends of the exciting coil 70 are located in the gap 60 between the first radially outer rotor core 56 and the second radially outer rotor core 58 in the axial direction, and that the radial inner end of the exciting coil 70 is located closer to the axis than the radially outer ends of the first radially outer rotor core 56 and the second radially outer rotor core 58 are in the radial direction.

The axial end on the second radially outer rotor core 58 side of the radially outer end of the first radially outer rotor core 56 is positioned in the axial direction on the opposite side of the axial end on the first radially outer rotor core 56 side of the exciting coil 70 from the second radially outer rotor core 58 side in the axial direction. The axial end on the first radially outer rotor core 56 side in the radially outer end of the second radially outer rotor core 58 is positioned in the axial direction on the opposite side of the axial end on the second radially outer rotor core 58 side of the exciting coil 70 from the first radially outer rotor core 56 side in the axial direction.

The exciting coil 70 is fixed to the stator 14. The first stator core 30 and the third stator core 34, which are provided on both sides in the axial direction of the stator 14, face the first radially outer rotor core 56 and the second radially outer rotor core 58 in the radial direction with the air gap 22 therebetween. The second stator core 32, which is provided in the center in the axial direction of the stator 14, faces the exciting coil 70 in the radial direction. In this regard, the exciting coil 70 is provided so as to protrude inward in the radial direction (that is, toward the axis) from the main body of the stator core 24 of the stator 14 and to be inserted into the gap 60 between the first radially outer rotor core 56 and the second radially outer rotor core 58, which is located radially outward of the shaft 50.

In this structure, the exciting coil 70 fixed to stator 14 is placed closer to the axis with respect to the main body of the stator core 24. This allows a space for placing the second stator core 32 of the stator core 24 to be provided radially outward of the exciting coil 70. In the structure of the present embodiment, the second stator core 32 that can serve as a path of magnetic flux is placed in the space located radially outward of the exciting coil 70 (see FIG. 6A).

Thus, according to the structure of the present embodiment, the width in the radial direction of the stator core 24 that can serve as a magnetic path radially outward of the exciting coil 70 can be increased as compared to a comparative structure as shown in FIG. 6B in which the second stator core 32 is not placed in the space located radially outward of the exciting coil 70. This can suppress concentration of the magnetic flux flowing in the axial direction in the stator core 24 radially outward of the exciting coil 70, whereby a magnetic path can be effectively formed when a rotating magnetic field is generated by application of current to the stator coils 28 or when magnetic flux is generated by application of current to the exciting coil 70.

Moreover, in the present embodiment, the second stator core 32 placed radially outward of the exciting coil 70 is a dust core made of a compressed soft magnetic material, and each of the first and third stator cores 30, 34 interposing the second stator core 32 therebetween in the axial direction is an electromagnetic steel plate core formed by a plurality of electromagnetic steel plates stacked in the axial direction. Thus, the magnetic resistance in the axial direction of the second stator core 32 is lower than that in the axial direction of the first and third stator cores 30, 34. This facilitates flow in the axial direction of the magnetic flux flowing in the stator coil 24 located radially outward of the exciting coil 70, and thus can reduce magnetic saturation radially outward of the exciting coil 70 during application of current to the exciting coil 70.

In a structure in which the second stator core 32 is formed by a plurality of electromagnetic steel plates stacked in the axial direction, the radial thickness of the second stator core 32 and the stator core 24 can be increased in order to obtain desired magnetic saturation characteristics. In the present embodiment, however, since the second stator core 32 is a dust core having relatively low magnetic resistance, it is not necessary to increase the radial thickness of the second stator core 32 in order to obtain desired magnetic saturation characteristics. Thus, according to the hybrid excitation rotating electrical machine 10 of the present embodiment, magnetic saturation during application of current to the exciting coil 70 can be reduced without increasing the overall size.

Thus, according to the present embodiment, torque that rotates the rotor 12 can be efficiently generated, and a torque increase upon rotating the rotor 12 can be implemented. This can suppress an increase in size of the device itself in order to generate large torque. In this regard, desired torque performance can be achieved even if ferrite magnets having a relatively small magnetic force are used as the permanent magnets 64, 68. This can eliminate the need to use, e.g., a neodymium magnet having a relatively large magnetic force, while achieving desired torque performance.

In the above embodiment, the first and second radially outer rotor cores 56, 58 correspond to the "first rotor core" and the "second rotor core" described in the claims, the first and third stator cores 30, 34 correspond to the "first stator cores" described in the claims, the second stator core 32 corresponds to the "second stator core" described in the claims, the back yoke portion 32a corresponds to the "back yoke portion" described in the claims, and the stator teeth portion 32b corresponds to the "stator teeth portion" described in the claims.

In the above embodiment, the first to third stator cores 30 to 34 of the stator core 24 have substantially the same inner diameter, and the exciting coil 70 is placed radially inward of the second stator core 32 located in the center in the axial direction. Thus, the entire stator core 24 is located on the radially outer side of the exciting coil 70, that is, is located on the side opposite to the axis in the radial direction, and the first to third stator cores 30 to 34 of the stator core 24 are not present, even partially, radially inward of the exciting coil 70. However, the first and third stator cores 30, 34 may be partially present radially inward of the exciting coil 70.

In the above embodiment, the second stator core 32 is formed by both the annular back yoke portion 32a and the stator teeth portion 32b protruding from the inner peripheral surface of the back yoke portion 32a toward the axis. However, the present invention is not limited to this, and the second stator core 32 may be formed only by the annular back yoke portion 32a or only by the stator teeth portions 32b having a plurality of pieces forming the stator teeth 26 arranged in the circumferential direction.

What is claimed is:

1. A hybrid excitation rotating electrical machine, comprising:
   a rotor having first and second rotor cores that are separated in an axial direction with a gap between the rotor cores, wherein first magnetic poles that are excited by a permanent magnet and second magnetic poles that are not excited by the permanent magnet are alternately arranged in a circumferential direction in each of the first and second rotor cores, the first magnetic poles of the first rotor core have a different polarity from that of the first magnetic poles of the second rotor core, and the first magnetic poles of one of the first and second rotor cores are placed so as to face the second magnetic poles of the other of the first and second rotor cores in the axial direction with the gap between the rotor cores;
   a stator that is placed radially outward of the rotor, that generates a rotating magnetic field rotating the rotor, the stator having first stator cores provided on both sides in the axial direction, and a second stator core provided in a center in the axial direction having lower magnetic resistance in the axial direction than the first stator cores;
   a yoke formed so as to cover an outer periphery of the first and second stator core and configured to support the first and second stator cores in a radial direction; and
   an exciting coil that is placed in the gap, and that excites the second magnetic poles; wherein
   the second stator core is a dust core formed by compression molding insulation coated soft magnetic material powder,
   the first stator core is an electromagnetic steel plate core formed by stacking a plurality of insulation coated electromagnetic steel plates in the axial direction,
   a stator core of the stator is divided in the axial direction into the second stator core and the two first stator cores interposing the second stator core between the first stator cores in the axial direction,
   the exciting coil is positioned so that both axial ends if the exciting coil are located in the gap between the first rotor core and the second rotor core in the axial direction, and that a radially inner end if the exciting coil is located closer to an axis than radially outer ends of the first rotor core and the second rotor core are in a radial direction;
   the first stator cores face the first rotor core and the second rotor core in the radial direction with an air gap therebetween;
   the second stator core faces the exciting coil in the radial direction,
   the second stator core is formed by a back yoke portion formed in an annular shape, and a stator teeth portion protruding from an inner peripheral surface of the back yoke portion toward the axis.

2. The hybrid excitation rotating electrical machine according to claim 1, wherein
   the back yoke portion and the stator teeth portion are formed as separate members.

3. The hybrid excitation rotating electrical machine according to claim 1, wherein
   the second stator core is formed integrally with the yoke that is provided radially outward of the stator so as to cover an entire periphery.

* * * * *